United States
Diem et al.

[11] 3,803,904
[45] Apr. 16, 1974

[54] APPARATUS FOR TESTING BALL BEARINGS

[75] Inventors: Rudolf Diem, Dittelbrunn; Horst Meurer, Schweinfurt, both of Germany

[73] Assignee: SKF Industrial Trading and Development Company N.V., Amsterdam, Netherlands

[22] Filed: Feb. 2, 1972

[21] Appl. No.: 222,966

[30] Foreign Application Priority Data
Feb. 13, 1971  Germany............................ 2106891

[52] U.S. Cl. ............................. 73/67.5 R, 73/103
[51] Int. Cl. ......................................... G01n 29/04
[58] Field of Search............... 73/10, 67.5 R, 67.8 S, 73/103

[56] References Cited
UNITED STATES PATENTS
3,540,266   11/1970   Lofgren .......................... 73/67.8 S

*Primary Examiner*—Donald O. Woodiel
*Assistant Examiner*—Arthur E. Korkosz
*Attorney, Agent, or Firm*—Murray Schaffer

[57] ABSTRACT

A ball is movably supported on a mechanism comprising a shaft rotatable about its central axis. A carrier is mounted at the end of the shaft. On the carrier a pair of spaced drive wheels journaled about a common axis and a third supporting element is mounted. The drive wheels and the supporting element are arrayed in a triangular pattern to support the ball adjacent the testing head.

9 Claims, 5 Drawing Figures

APPARATUS FOR TESTING BALL BEARINGS

BACKGROUND OF THE INVENTION

The present invention relates to apparatus for testing the homogeneity and flawlessness of balls used, for example, in ball bearings.

The invention employs an ultrasonic method for testing balls and deals mainly with the drive mechanism for rotating and revolving (hobbing) the ball to be tested, which assures, that the entire surface of the ball is sensed by the probing or testing device. In general, the probing head is arranged to be tangential or adjacent to the ball to be tested so that very little friction ensues and the geometrically correct development of the ball is not disturbed or changed. Optical and electro-inductive test systems may also be employed.

A device for mechanically rotating balls is known from Austrian Patent 188 924, whereby two coaxial conical drive wheels which rotate with relative different speed drive the ball to be tested. In order to obtain the periodic changing rotational movement of the drive wheels, a special linkage with eccentrically positioned hinged points is necessary. Thus, the axis of one conical drive wheel has to be within the axis of the other conical drive wheel and both driving axles have to be supported exactly on the same axis.

In another machine German Pat. No. 1,049,594, the ball to be tested is driven through a friction roller, whose axis of rotation is itself made to rotate by a gear with spur and bevel gears. The ball to be tested touches the driving friction roller only at one point, so that, should there be any unfavorable conditions, as for instance too great a pressure from the testing head, the ball does not hob in the manner desired, and therefore, the whole surface is not covered by the sensing head.

In another German Pat. No. 1,276,914, a device for hobbing balls is provided in which the ball is supported, at one location, relative to a scanning device. A ball to be tested is moved in such a manner that the course of the operating sequence results in a meridian system, by bringing the ball to be tested into revolution by means of a drive disk and giving it, by means of a control disk, the rotation impulses which are necessary for the desired development. The disadvantage of this device, however, is that the control disk, because of its geometrically complicated form, is very difficult to manufacture and necessitates an exceptionally high degree of precision. Control disks which have been running for long periods lose the geometrical precision necessary for control. Furthermore, when the size of the balls to be tested is changed, another control disk has to be provided.

Finally, in German Pat. No. 1,573,840, there is described a device in which two drive rollers, by rotation and axial oscillation, revolve the ball to be tested. This device has the advantage, that it is very easy to manufacture and it is possible to load and unload the balls quickly, which is especially desirable for automatic testing. It has been found, however, that on account of the high ratio of friction occurring in the system, scanning by touching the balls is not possible. In addition, under certain circumstances, as for instance the unfavorable adjustment of the materials and weights of the drive rollers and support rollers, the exact geometrical ratios would be disturbed during the testing of the surface of the ball.

It is among the objects of the present invention to avoid the above mentioned disadvantages; to provide a device for non-destructive testing of balls; which is simple to build; which can be used for different sizes of balls; which assures the reliable scanning of the entire surface of the ball and which is capable of using, either touch or spaced sensing systems.

SUMMARY OF INVENTION

According to the present invention the ball is movably supported on a mechanism comprising a shaft rotatable about its central axis. A carrier is mounted at the end of the shaft. On the carrier a pair of spaced drive wheels journaled about a common axis and a third supporting element is mounted. The drive wheels and the supporting element are arrayed in a triangular pattern to support the ball adjacent the testing head. Preferably, a bearing post of low frictional material is arranged coaxially with the shaft on the opposite side of the ball.

In the preferred embodiment, the shaft and carrier and the wheels are slidable to permit entry and removal of the ball and means for feeding the ball automatically to the mechanism is provided.

Full details of the present invention are given in the following description and are shown in the accompanying drawing.

DESCRIPTION OF INVENTION

Figure 1:
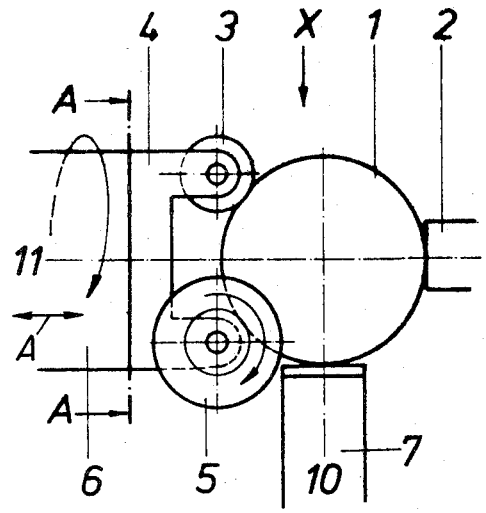
FIG. 1 is a schematic side view of the inventive mechanism.
Figure 2:
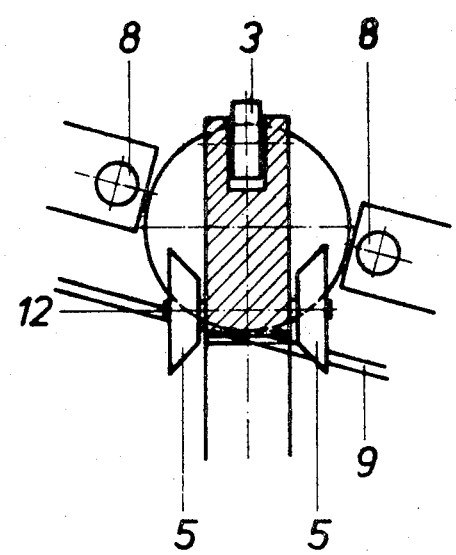
FIG. 2 is a front view along line A—A of FIG. 1.
Figure 3:
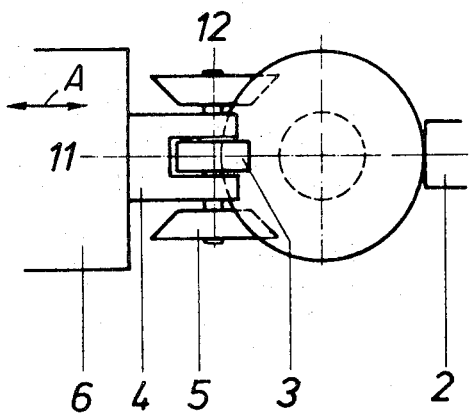
FIG. 3 is a plan view in the direction of line X of FIG. 1.
Figure 4:
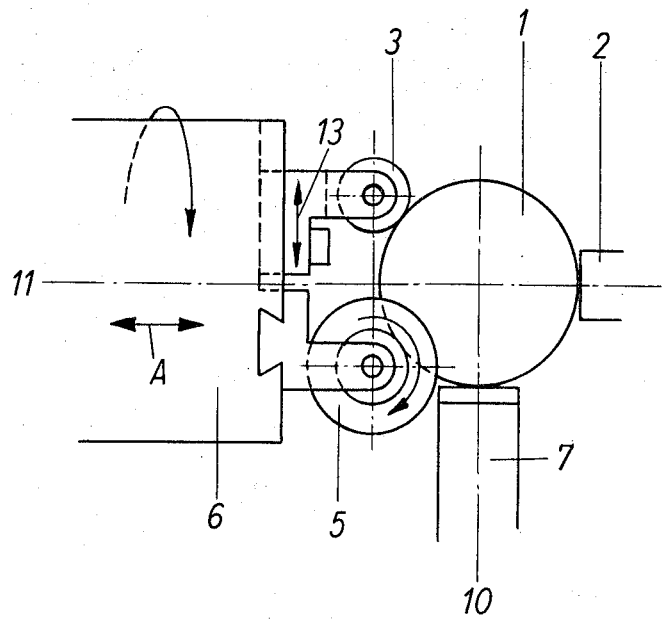
FIG. 4 is a schematic side view showing the interlocking roller housing.
Figure 5:
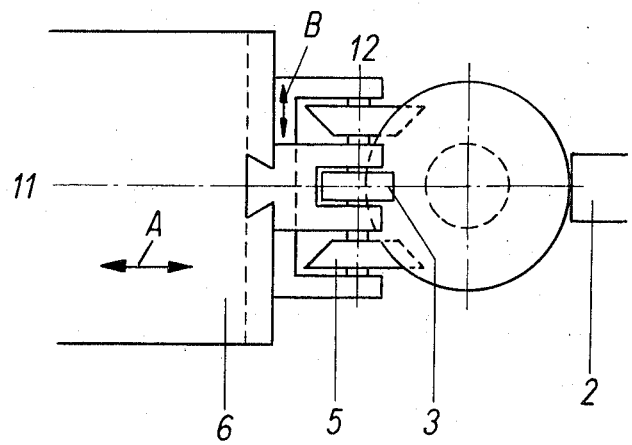
FIG. 5 is a plan view showing the interlocking roller housing.

As seen in FIG. 1 the ball 1 to be tested is supported between a bearing post 2 and a drive mechanism comprising a freely rotating cylindrical supporting element 3 and a pair of conical or inwardly tapering drive wheels 5 secured on a common axis 12. The drive wheels 5 which are formed with highly frictional material and the freely rotating element 3 are arranged in a triangular array and generally coplanar, as seen in FIG. 2, on a common carrier 4 mounted at the end of a rotatable shaft 6. The shaft 6 and the conical friction drive wheels 5 are each positively driven so that the shaft 6 will rotate about the central axis 11 (as indicated by the arrow in FIG. 1) and so that the wheels 5 will rotate about their axis 12 which is perpendicular to the axis 11. Conventional transmissions, worm gearings, cone pulley drives, chain drives and the like may be used to drive the shaft 6 and wheels 5. The bearing post 2 lies along the axis of rotation 11 on the other side of the ball, in opposition to the triangular array of wheels 5 and supporting element 3. The bearing post 2 may be formed of material having a low coefficient of friction such as nylon, teflon, polished stainless steel, a pneumatic or hydrostatic bearing, a hydrodynamic bearing, a spherical spiral groove bearing, a ball or roller bearing or similar low friction device.

A test head 7, preferably an ultrasonic device and system (optical photo-electric or electro-inductive sensing device may also be used) is arranged adjacent to or in contact with the ball 1 along an axis 10 running transversely to the axis of rotation 11 of the shaft 6.

During testing of the ball 1, the shaft 6 rotates, consequently, revolving the wheels 5 and supporting element 3 about the axis 11. At the same time the wheels 5 are rotated about their axis 12. Preferably, the shaft 6 is rotated at a higher speed (R.P.M.) than the speed (R.P.M.) of the wheels 5. Because of the frictional wheels 5, the ball 1 is, consequently, rotated and revolved relative to the testing head 7, in a hobbing stepping or quasi-meridional system. The relative meridian distances during the rotation-revolution or stepping of the ball 1 will depend upon the relative number of revolutions of shaft 6 with respect to those of the friction wheels 5. In this manner, after only a short time the entire surface of the ball can be sensed by the testing head 7.

The shaft 6 and carrier 4 are mounted to be axially movable toward and away from the bearing post 2 so that the ball 1 to be tested may be located therebetween and after testing, it may be removed. The ball 1 is held between a pair of guide pins 8 and rolls into and out of position on an inclined track 9. By sequential moving of the shaft 6 and each of the pins 8, the ball may be forwarded and/or removed from the test position during its downward roll on track 9.

When an ultrasonic testing head is employed it may be necessary to wet the surface of the ball to provide a coupling fluid film necessary for the sensing function. This may be accomplished by locating a felt wheel or nib or similar device so as to be in contact with or to deposit the fluid on the ball. Furthermore, the position of the ultrasonic head may be adjusted to vary the beam depth and thus the depth at which the ball surface is tested. Still further, the friction wheels 5 need not be conical. Since a triangular array is provided the friction wheels 5 may be cylindrical or otherwise shaped.

The supporting element 3 may be replaced with a low friction post, such as one similar to that of bearing post 2, or simply made of nylon or teflon. The supporting element 3 is arranged to be adjustably slidable at a right angle to axis 11 while the friction wheels 5 are jointly slidable at right angles to the axes 10 and 11. The axis 10 is the axis of the sensing head passing through the center of the ball 1.

Since by this arrangement the ball to be tested is touching at least at three points secured to the rotating shaft, there is assured, that in addition to a revolving movement of the friction wheels also a revolving movement by the shaft is transmitted to the ball, so that the ball, to an onlooker, hobs fully in a meridian system. In order to obtain this movement neither a complicated linkage mechanism nor a control disk, difficult to manufacture, is required.

A further advantage of the invention lies in the fact that the shaft which carries the carrier 4 is axially movable. This movability has the advantage, that an automatic testing procedure can be obtained in which the drive mechanism can be moved in its position and the input and output of the balls to be tested is made easy.

The movability of the supporting element 3 which provides another advantage of the invention is that it makes possible the use of the testing device for different sizes of balls. Also, the slidable friction wheels enables the fine adjustment of the device to vary the center of rotation of the ball during testing.

The slanted input track 9 and control pins 8 provide the means for completely automatic feeding.

Various modifications and changes can be made to the described apparatus. Accordingly, the present disclosure is to be taken as illustrative only.

What is claimed:

1. Apparatus for movably supporting a ball relative to a testing head comprising a shaft rotatable about its central axis, a carrier mounted on said shaft, said carrier supporting a pair of spaced drive wheels journaled about a common axis transverse to the axis of rotation of said shaft and a supporting element spaced therefrom, said drive wheels and said supporting elements being arranged in a triangular array on said carrier to receive said ball, a bearing spaced from said carrier adapted to seat said ball in triangular array with respect to said testing head, and means for rotating said shaft and said drive wheels whereby to impart to said ball a meridian course of movement.

2. Apparatus according to claim 1 wherein said bearing is arranged coaxially with the axis of rotation of said shaft and on the opposite side of said ball to said shaft.

3. The apparatus according to claim 2, wherein said bearing has a low coefficient of friction.

4. The apparatus according to claim 2 wherein said shaft and carrier are conjointly slidable along the axis of rotation.

5. The apparatus according to claim 2, wherein the supporting element is slidable at right angles to the axis of rotation and to the common axis of said wheels.

6. The apparatus according to claim 2, wherein the drive wheels are formed of highly frictional material.

7. The apparatus according to claim 2, wherein the common axis of said drive wheels is slidable at right angles to the axis of rotation.

8. The apparatus according to claim 1, including an ultrasonic testing system.

9. The apparatus according to claim 1, including means for conveying the ball to and from said carrier comprising an inclined track spaced adjacent said carrier by which said ball may be rolled on to said drive wheels and supporting element and pin retaining means for holding said ball in position on said drive wheels and supporting element.

* * * * *